Aug. 24, 1926.  1,597,346
F. C. FANTZ ET AL
TRACK SPRAYING APPARATUS
Filed Sept. 12, 1921  3 Sheets-Sheet 1

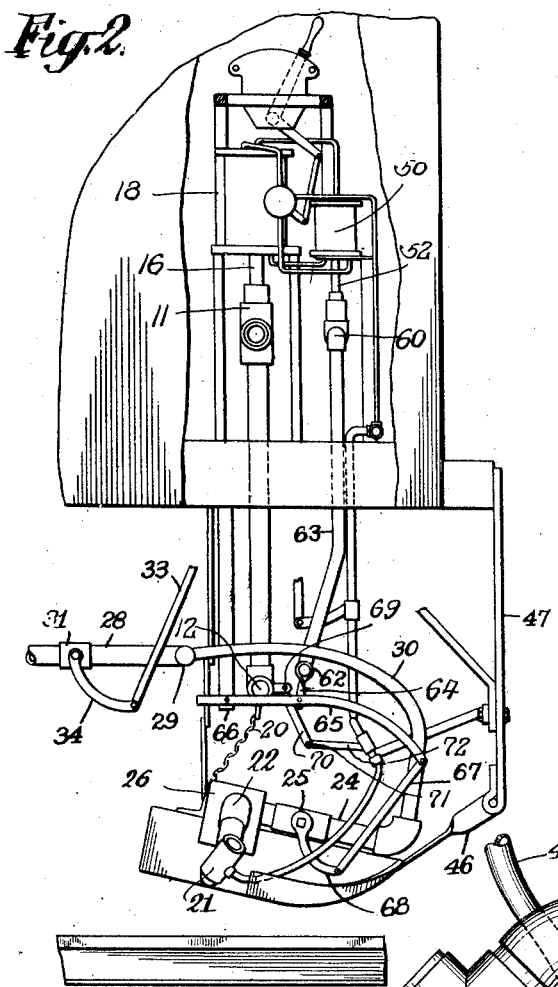
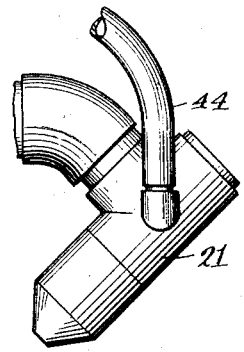
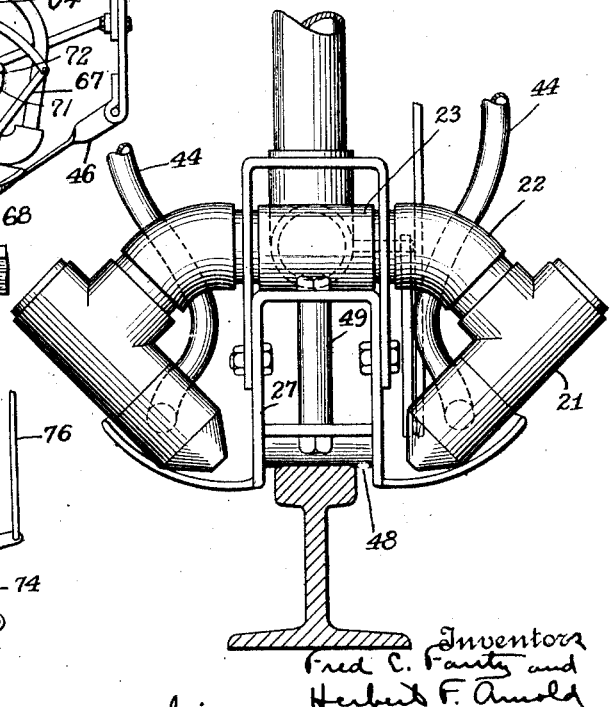
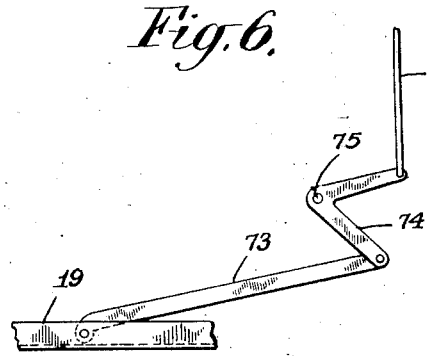

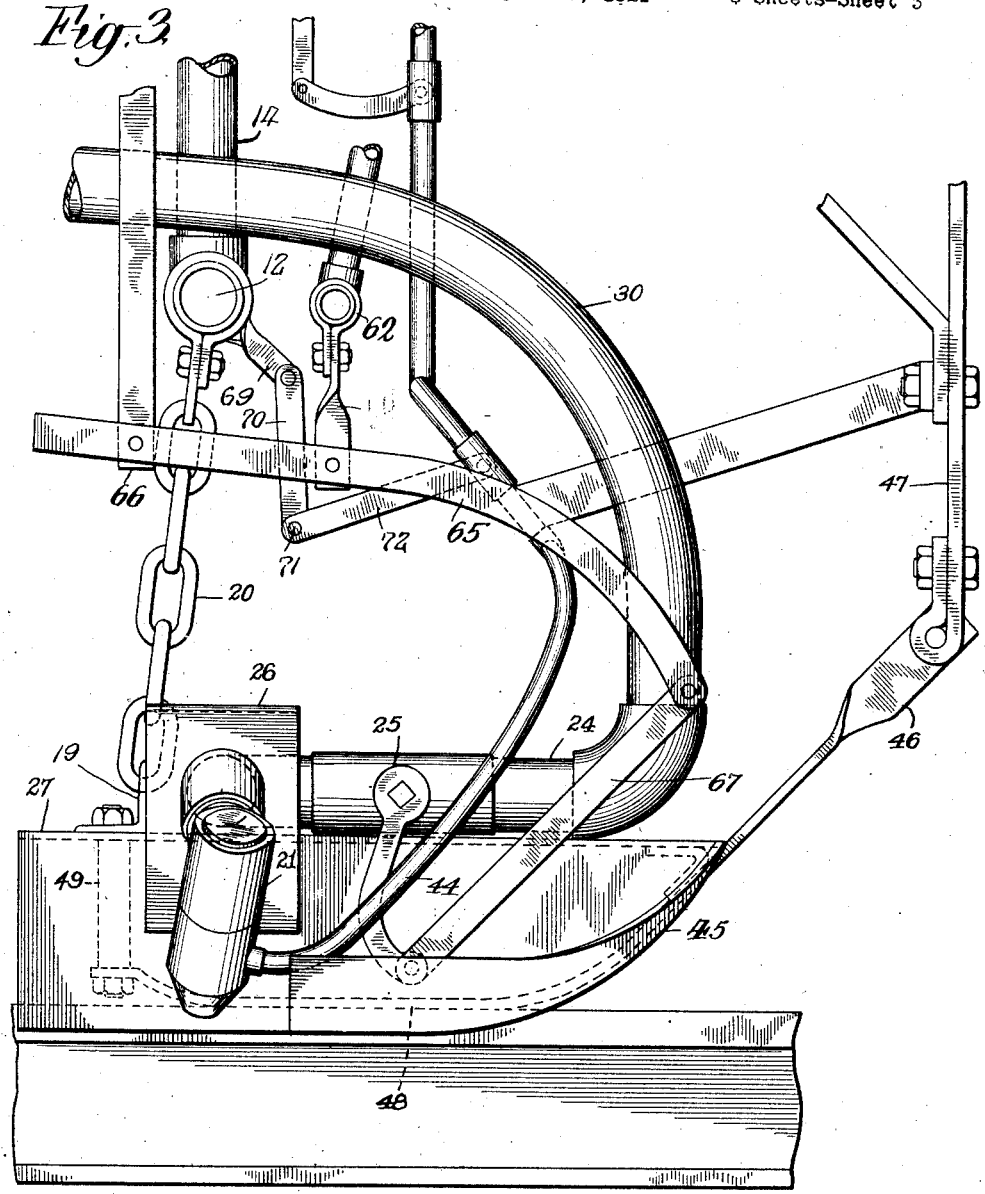

Patented Aug. 24, 1926.

1,597,346

UNITED STATES PATENT OFFICE.

FRED C. FANTZ AND HERBERT F. ARNOLD, OF PORT ARTHUR, TEXAS, ASSIGNORS TO THE TEXAS COMPANY, OF NEW YORK, N. Y., A CORPORATION OF TEXAS.

TRACK-SPRAYING APPARATUS.

Application filed September 12, 1921. Serial No. 499,966.

This invention relates to apparatus for treating railways and has special reference to mechanism of the general character shown and described in Patent 1,169,990 granted February 1, 1916, to Andrew J. Neafie and in the pending application of John Nicholson, Serial No. 364,842, filed March 10, 1920.

One object of the invention is to provide track spraying mechanism capable of continuous operation, that is, adapted to function properly without interruption either by reason of passing frogs, crossings or the like, or by the presence of obstructions on the track.

When track spraying mechanism as hitherto constructed approached a crossing or other irregularity or an obstruction on the road it has been necessary to elevate the spraying apparatus until the car had passed over the obstacle. In accordance with the present invention means is provided by which the spraying mechanism is so guided that it is held in spraying position regardless of curves in the track, crossings or anything that would have a tendency to deflect the spraying device from the rails. Furthermore the invention contemplates the provision of means for brushing aside obstacles on the track, such as, stones and the like, the presence of which would cause the spraying mechanism to be moved from its proper course or cause injury to the sprayers.

Another object of the invention is to improve the control and regulation of the flow of the spraying fluids in such manner as to avoid spraying the tread of the rails at any time during the operation.

In track spraying apparatus hitherto in use wherein automatic means was provided for controlling the flow of fluids dependent upon the raising and lowering of the spraying device some difficulty has been experienced due to the fact that when raising and lowering the spraying mechanism, since the sprayers are necessarily moved from the proper operating position, more or less liquid is caused to fall on the tread of the rail.

In accordance with our invention automatic means responsive to a hand lever or the like is provided by which the flow of liquid through the sprayers is stopped and the sprayers raised, the arrangement being such that the movement raising the sprayers is caused to lag behind the closing of the valves and the lowering of the sprayers is completed before the opening of the valves.

With the above and other objects in view the invention consists in the construction, combination and arrangement of parts hereinafter more fully set forth, pointed out in the claims and illustrated in the accompanying drawings in which:

Figure 2 is a side elevation of the apparatus.

Figure 3 is a side elevation drawn to a larger scale than the preceding figures and showing a portion of the apparatus in detail.

Figure 4 is a detail view of a pair of sprayers arranged in operating position over the rail.

Figure 5 is a detail view of one of the sprayers.

Figure 6 shows a lever arrangement for shifting the spraying mechanism.

Figure 1:
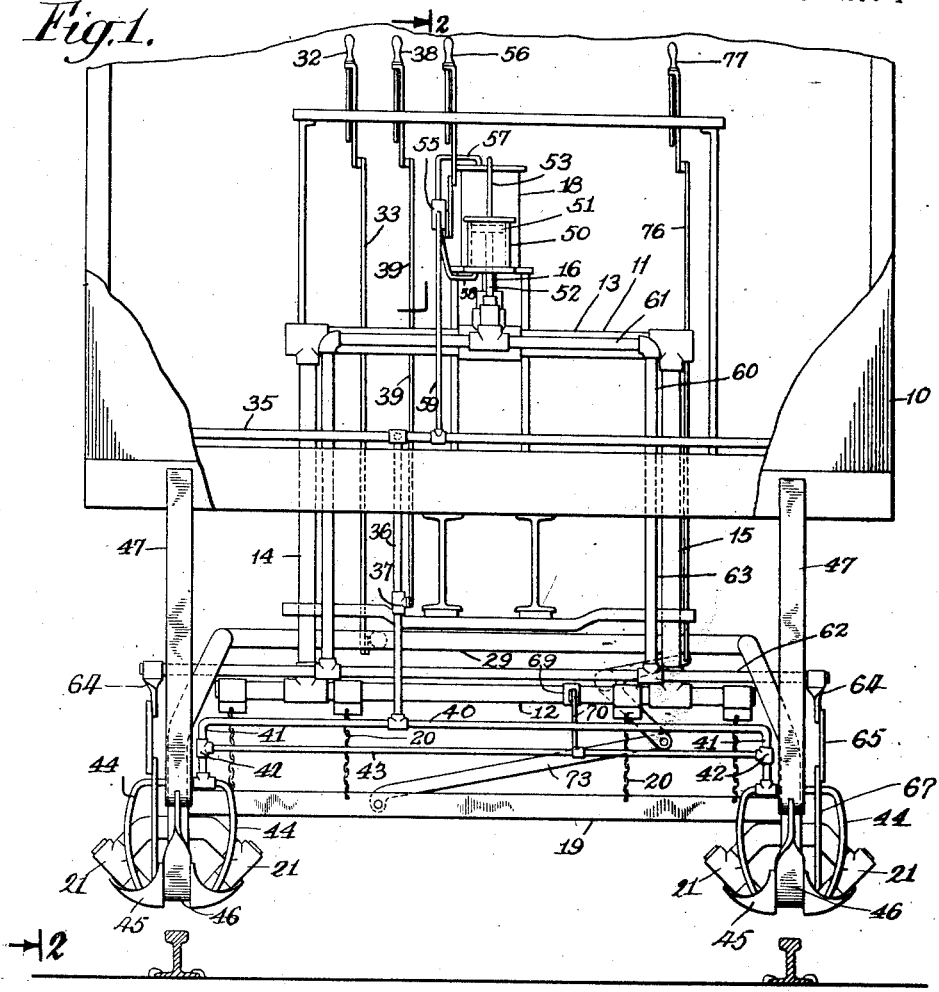
Figure 1 is a front elevation of a car equipped with a track spraying device which constitutes an embodiment of this invention.

10 designates a car which is intended to be representative of any suitable railway vehicle which may be equipped with the rail spraying apparatus and control mechanism of our invention. The apparatus includes a frame 11 for supporting the sprayers and may, for example, be formed of piping consisting of a transverse tubular support 12 at the bottom joined to a tubular cross bar 13 by means of vertically extending tubular supports 14 and 15. The top crossbar 13 is connected to a piston rod 16 actuated by a piston 17 positioned within the cylinder 18.

A crossbeam 19 is attached to the frame 11 by means of straps or chains 20. The crosspiece 19 serves to support pairs of sprayers 21 each pair being in position to spray one of the rails. The arrangement of nozzles for each rail is identical and it will be necessary to describe only one set in detail.

As clearly shown in Figures 3 and 4 each sprayer 21 is attached to an elbow 22 each of which communicates with a T 23 which is connected to an oil supply pipe 24. The T 23 is mounted in a support 26 which is attached to a three-sided guide member or baffle 27. As illustrated the support 26 is a three-sided figure and holes are provided through which the T 23 extends permitting the sprayers to hang at the proper angle to spray the side of the rail. Each of the baffles 27 is attached to one end of the crossbar 19 and straddles the tread of the rail and prevents oil from being sprayed onto the tread of the rail.

The oil or other liquid with which it is desired to spray the rails is conducted from a suitable source of storage through a pipe 28 which is connected to a crosspipe 29 to each end of which is attached a flexible hose or pipe connection 30 which communicates with the pipe 24 by which the liquid is delivered to the T 23 and thence through the elbows 22 to the spraying nozzles 21. The passage of liquid to the sprayers is controlled by a valve 31 in the pipe 28 (see Figures 1 and 2), the valve being operated by a hand lever 32 through the levers 33 and 34.

A pipe 35 communicates with a suitable source of compressed air or other gas for atomizing or spraying purposes. The pipe 35 has a branch pipe 36 having a valve 37 controlled by a hand lever 38 through the lever 39. The pipe 36 communicates with a transverse pipe 40 which terminates at either end in downwardly extending pipes 41 in which are valves 42 operated by a common valve rod 43, the operation of which will be presently set forth. Each of the pipes 41 has branch lines 44 which conduct the air or atomizing fluid to the sprayers 21.

The member 27 which has hereinbefore been referred to forms a portion of a shoe which is adapted for guiding the spraying mechanism and holding the sprayers in proper operating position regardless of obstacles along the track. The front portion of the shoes is in the form of a flaring member 45 which flares laterally as well as in a forward direction. Each of the flared shoes is attached by a strap 46 to a bracket 47, the arrangement being preferably such that the shoe will be dragged along during the running of the car 10 rather than pushed. The strap 46 is connected to a member 48 which extends longitudinally of the shoe and is adapted to ride the rail. The rear end of the member 48 may be attached by a bolt 49 to the top of the three-sided member 27, the rail piece 48 being positioned within the member 27 in such manner that the lower part of the sides of the latter serves to keep the shoe on the rail, as is shown in Figure 4.

Figure 7:
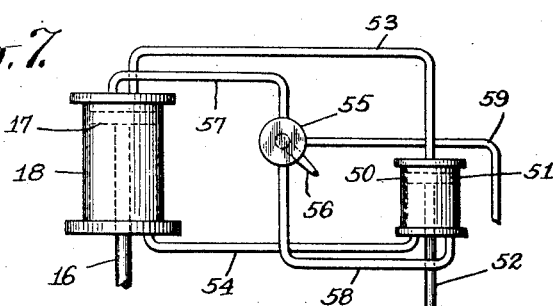
Figure 7 is a diagrammatic representation of the arrangement of the cylinders and the air lines connected thereto.

The opening and closing of the valves 25 which control the supply of liquid to the sprayers is automatically effected by means of a cylinder 50 which is adapted to operate in connection with the cylinder 18 and which is preferably constructed of smaller capacity than cylinder 18. As clearly shown in Figure 7 the cylinder 50 is provided with a piston 51 and piston rod 52. A pipe 53 connects the upper portions of the two cylinders and a pipe 54 connects the lower portions. A three-way valve 55 operated by a hand lever 56 regulates the admission of air or gas to the cylinders. A pipe 57 extends from one of the ports of the valve to the upper part of the cylinder 18 and a pipe 58 extends from another port to the bottom of cylinder 50. The operating fluid is supplied to the other port of the valve by a pipe 59 which is a branch of the main gas or air supply pipe 35, as shown in Figure 1.

The piston rod 16 of the cylinder 18 operates to raise and lower the framework 11 which supports the sprayers and shoes while the piston rod 52 of the auxiliary cylinder operates a frame 60 which controls the valves 25 in the pipes 24. As illustrated in Figure 1 the outer end of the piston rod 52 is connected to a transverse member 61 which is preferably in the form of a pipe or tube. Another transverse tubular member 62 is connected to the top crosspiece 61 by vertically extending tubular supports 63 to form the frame 60. Each end of the tubular crosspiece 62 is provided with a bracket 64 upon which is pivotally mounted a lever 65. One end of the lever 65 is pivotally secured at 66 and the other end is connected by means of a link 67 to a lever 68 which operates the valve 25, the arrangement being such that when the frame 60 is raised the valve 25 is closed and when the frame is lowered the valve is opened.

The raising and lowering of the frame 11 which supports the shoes and sprayers automatically operates to close and open the air supply valves for the sprayers. The lower tubular support 12 of the frame 11 is provided with a bracket 69. One end of a lever 70 is pivotally secured to the bracket 69 and the other end is pivotally joined at 71 to a lever 72 which is rigidly attached to the valve rod 43 which operates the valves 42, the arrangement being such that upon a lowering of the frame 11 the valves 42 are opened and with a raising of the frame the valves are closed.

It is sometimes necessary to shift the shoes and spraying mechanism into operating position. For example if the mechanism should have been in elevated position with the car on a curve it would be necessary to shift it laterally before it could be lowered into proper position. To provide for such contingencies one end of a shift lever 73 is attached to the crosspiece 19. The other end of the lever 73 is connected to one end of a V lever 74 which is pivoted at 75. The other end of the V is connected to the operating rod 76 the movement of which is controlled by a hand lever 77.

In operation the shoes ride over the rails guiding the spraying mechanism so that the spray of oil or other coating liquid is properly directed against the sides of the rails. The shoe guides the spraying mechanism around curves, over crossings, frogs and the like and brushes aside any ordinary obstructions that may be on the track. The rail spraying car may thus be operated without the usual stoppages which have hitherto been necessary in operating cars of this type and moreover the coating liquid may be readily applied at all points desired. The car may also be operated at greater speeds than has hitherto been possible since the shoes so efficiently hold the mechanism to the rails.

Whenever it is desired to elevate the shoes and spraying mechanism the operator moves the hand lever 56 controlling the three-way valve 55 so as to cause air under pressure to pass from the main supply pipe 35 and branch line 59 to the valve and thence through the pipe 58 to the underside of the piston 51 in the auxiliary cylinder 50. The air overflows from this auxiliary cylinder through the line 54 to the underside of the piston in the main cylinder 18. It will be noted that the weight on the piston rod 16 in the main cylinder is greater than that on the piston rod 52, since the frame 11 carries the shoes and sprayer and the weight of the frame itself is, moreover, preferably heavier than that of the frame 60. The result is that the piston 51 moves upward before the piston 17, the upward motion of the piston 51 raising the frame 60 and closing the valves 25 before the action of the piston 17 raises the frame 11 and moves the sprayers and shoes into the elevated position, as illustrated in Figures 1 and 2. Since the valves controlling the supply of liquid to the sprayers are thus closed before the sprayers are elevated no liquid is sprayed on the tread of the rail during the raising. The raising of the spraying mechanism operates to automatically close the air supply valves 42 as has hereinbefore been explained.

When it is desired to lower the mechanism into operating position, the hand lever 56 is moved so that air passes from line 59 through the valve 55 and thence through pipe 57 to the upper side of the piston 17 of the main cylinder 18. The air overflows from the main cylinder to the upper side of the piston in the auxiliary cylinder. The greater weight on the piston 17 causes this piston to descend before piston 51 thereby causing the mechanism to be lowered into position before the valves 25 are opened. The spraying of liquid onto the tread of the rails is thus avoided during the lowering of the mechanism.

Apparatus of preferred form and construction has been illustrated and described for the purpose of showing a way in which this invention may be used, but the inventive thought upon which the application is based is broader than the illustrative embodiment thereof, and we therefore intend no limitations other than those imposed by the appended claims.

What we claim is:—

1. Apparatus comprising a car adapted to be propelled over a railway track, a spray nozzle mounted on said car, fluid connections communicating with said nozzle, valves in said connections, means for raising and lowering the nozzle and opening and closing the valves, the arrangement being such that the upward movement of the nozzle lags behind the closing of the valves and the opening of the valves lags behind the downward movement of the nozzle.

2. Apparatus comprising a car adapted to be propelled over a railway track, a spray nozzle mounted on said car, fluid connections communicating with said nozzle, valves in said connections and means for raising and lowering the nozzle and controlling the valves comprising a pair of air operated cylinders and a piston rod in each cylinder one of which is adapted to control the raising and lowering of the nozzle and the other of which is arranged to control the valves in such manner that the upward movement of the nozzle lags behind the closing of the valves and the opening of the valves lags behind the downward movement of the nozzle.

3. Apparatus comprising a car adapted to be propelled over a railway track, a spray nozzle mounted on said car, and means for raising and lowering the spraying mechanism and controlling the flow of fluid thereto comprising a pair of cylinders each of which has a piston therein one of which is arranged to control the raising and lowering of the spraying mechanism and the other of which is arranged to control the flow of fluid through the spraying mechanism, means for admitting compressed air to the under side of the piston controlling the flow of fluid, means for conducting said air to the under side of the other piston, means for admitting compressed air to the upper side of the piston controlling the raising and lowering of the spraying mechanism and means for conducting said air to the upper side of the other piston.

4. Apparatus comprising a car adapted to be propelled over a railway track, a pair of cylinders each of which has a piston rod depending therefrom, a frame attached to one of said rods, spraying mechanism attached to said frame, a frame attached to the other piston rod, means connected to said frame for controlling the flow of fluid through the spraying mechanism, means for admitting compressed air to the under side of the cylinder controlling the flow of fluid through the spraying mechanism, means for conducting said air to the under side of the other cylinder, means for admitting compressed air to the upper side of the latter cylinder and means for conducting said air to the upper side of the other cylinder.

5. Apparatus comprising a car adapted to be propelled over a railway track, a cylinder having a piston rod depending therefrom, a frame attached thereto, a spraying nozzle supported by said frame, liquid and air connections to said nozzle, a cylinder of smaller capacity than the other cylinder, a piston rod depending therefrom, a frame attached to said piston rod, means in connection with said frame for controlling the flow of liquid to the spraying nozzle, a source of compressed air, a three-way valve controlling the admission of compressed air to the cylinders in such manner that air may be admitted to the under side of the small cylinder and the upper side of the large cylinder, and pipes connecting the upper ends of the cylinders and the lower ends of the cylinders, respectively.

6. Apparatus comprising a car adapted to be propelled over a railway track, a cylinder having a piston rod depending therefrom, a frame attached thereto, a spraying nozzle supported by said frame, liquid and air connections to said nozzle, a cylinder of smaller capacity than the other cylinder, a piston rod depending therefrom, a frame attached to said piston rod, means in connection with said frame for controlling the flow of liquid to the spraying nozzle, a source of compressed air, a three-way valve controlling the admission of compressed air to its cylinders in such manner that air is admitted to the under side of the small cylinder and the upper side of the large cylinder, pipes connecting the upper ends of the cylinders and the lower ends of the cylinders, respectively, and automatic means for controlling the supply of air to the spraying nozzle responsive to the raising and lowering of the nozzle.

7. Apparatus comprising a car adapted to be propelled over a railway track, a spray nozzle mounted on said car, connections for admitting air to the nozzle, connections for admitting liquid to the nozzle, valves in said connections, means for conjointly raising and lowering the nozzle and controlling the admission of liquid to the nozzle, the arrangement being such that the upward movement of the nozzle lags behind the closing of the valve and the opening of the valve lags behind the downward movement of the nozzle.

8. Apparatus comprising a car adapted to be propelled over a railway track, a spray nozzle mounted on said car, connections for admitting air to the nozzle, connections for admitting liquid to the nozzle, means for raising and lowering the nozzle and controlling the admission of liquid to the nozzle, the arrangement being such that the upward movement of the nozzle lags behind the closing of the valve and the opening of the valve lags behind the downward movement of the nozzle, and automatic means for controlling the admission of air to the nozzle dependent on the raising and lowering of the nozzle.

9. Apparatus comprising a car adapted to be propelled over a railway track, a spraying mechanism adapted to spray the rails, connections for admitting air to said spraying mechanism, connections for admitting liquid to said spraying mechanism, a lever arranged to control the flow of liquid through the liquid connections, a lever arranged to control the flow of air through the air connections and a lever arranged to conjointly control the raising and lowering of the spraying mechanism and the flow of liquid through the liquid connections in such manner that the raising of the spraying mechanism lags behind the shutting off of the liquid and the opening of the liquid connections lags behind the lowering of the spraying mechanism.

10. Apparatus comprising a car adapted to be propelled over a railway track, a spraying mechanism adapted to spray the rails, connections for admitting air to said spraying mechanism, connections for admitting liquid to said spraying mechanism, a lever arranged to control the flow of liquid through the liquid connections, a lever arranged to control the flow of air through the air connections and a lever arranged to conjointly control the raising and lowering of the spraying mechanism and the flow of liquid through the liquid connections in such manner that the raising of the spraying mechanism lags behind the shutting off of the liquid and the opening of the liquid connections lags behind the lowering of the spraying mechanism, and automatic means for controlling the flow of air to the air connections dependent on the raising and lowering of the spraying mechanism.

11. Apparatus comprising a car adapted to be propelled over a railway track, spraying mechanism adapted to spray the rails, connections for admitting air to the spraying mechanism, connections for admitting liquid to the spraying mechanism, a lever arranged to control the flow of liquid to the liquid connections, a lever arranged to control the flow of air to the air connections, a lever arranged to operate a three-way valve, means for admitting compressed air to one of the ports of said valve, a pair of cylinders, a connection from one port of said valve to the lower part of one of the cylinders, a connection from the other port of said valve to the upper part of the other cylinder, connections between the lower portions and the upper portions, respectively, of the cylinders, pistons operatively mounted within the cylinders one of said pistons being adapted to raise and lower the spraying mechanism and the other being adapted to control the flow of liquid in the liquid connections.

12. Apparatus comprising a car adapted to be propelled over a railway track, spraying mechanism mounted on said car, means for admitting fluid to the spraying mechanism, means for raising and lowering the spraying mechanism, and means operatively connected with said spraying mechanism comprising a shoe adapted to straddle the tread of the rail for guiding the spraying mechanism on the track and formed with flared portions for brushing aside obstructions on the track.

13. Apparatus comprising a car adapted to be propelled over a railway track, spraying mechanism mounted on said car, means for admitting fluid to the spraying mechanism, and means for guiding the spraying mechanism comprising shoes adapted to straddle the treads of the rails, each of said shoes being formed with a flared portion for brushing aside obstructions on the rails, and means for simultaneously raising and lowering said shoes and said spraying mechanism.

14. Apparatus comprising a car adapted to be propelled over a railway track, a pair of nozzles for each rail, a frame mounted on the car and adapted to support the nozzles, mechanical means for raising and lowering the frame to and from the car, means for supplying fluid to the nozzles, and a pair of shoes adapted to straddle the treads of the rails for guiding the nozzles and formed with flared portions for brushing aside obstructions on the tracks, the shoes being operatively attached to the frame and adapted to be automatically raised and lowered therewith.

15. Apparatus comprising a car adapted to be propelled over a railway track, a pair of nozzles for each rail, a frame mounted on the car and adapted to support the nozzles, means for raising and lowering the frame, means for supplying fluid to the nozzles, a pair of shoes attached to the frame and arranged to straddle the tread of the rails so as to guide the nozzles and a strap attached to the forward end of each shoe and connected to the car.

16. Apparatus comprising a car adapted to be propelled over a railway track, a pair of nozzles for each rail, a frame mounted on the car and adapted to support the nozzles, means for raising and lowering the frame, means for supplying fluid to the nozzles, means adapted to straddle the tread of the rails for guiding the nozzles, and means comprising flared members formed on the guiding means for brushing obstructions from the rails.

17. Apparatus comprising a car adapted to be propelled over a railway track, a pair of nozzles for each rail, a frame mounted on the car and adapted to support the nozzles, means for raising and lowering the frame, means for supplying fluid to the nozzles, a pair of shoes each of which comprises a member adapted to ride the rail and guide the nozzles and a forward member which flares laterally and forwardly for brushing obstructions from the rail and means for pulling the shoes over the rails.

18. Apparatus comprising a car adapted to be propelled over a railway track, a pair of spray nozzles for each rail, fluid connections communicating with the nozzles, valves in said connections, means for raising and lowering the nozzles and opening and closing the valves, the arrangement being such that the upward movement of the nozzles lags behind the closing of the valves and the opening of the valves lags behind the downward movement of the nozzles, and shoes adapted to guide the nozzles.

19. Apparatus comprising a car adapted to be propelled over a railway track, a pair of spray nozzles for each rail, fluid connections communicating with the nozzles, valves in said connections, means for raising and lowering the nozzles and controlling the valves comprising a pair of air operated cylinders one of which is adapted to control the raising and lowering of the nozzles and the other of which is arranged to control the valves in such manner that the upward movement of the nozzles lags behind the closing of the valves and the opening of the valves lags behind the downward movement of the nozzles, and shoes adapted to ride the rails and guide the spraying mechanism.

In witness whereof we have hereunto set our hands this 24th day of August, 1921.

FRED C. FANTZ.
HERBERT F. ARNOLD.